July 4, 1950 G. E. GLISS 2,513,795
STRAINER
Filed Aug. 30, 1946

INVENTOR
G. E. GLISS
BY
ATTORNEY

Patented July 4, 1950

2,513,795

UNITED STATES PATENT OFFICE 2,513,795
STRAINER

George E. Gliss, Baltimore, Md., assignor to Western Electric Company, Incorporated, New York, N. Y., a corporation of New York Application August 30, 1946, Serial No. 693,857

3 Claims. (Cl. 146—174)

This invention relates to strainers, and more particularly to strainers for straining oversized particles from plastic material.

In the manufacture of products from plastic material, such as vulcanizable compounds including rubber or synthetic rubberlike material, it is sometimes desirable to strain the material. Some strainers may include a backing plate having passages therein and a fine screen positioned over the backing plate. The material extruded passes through the fine screen, which strains oversized particles therefrom, and then through the passages in the backing plate. The oversized particles vary from quite large particles to particles that are just above the size permitted to pass through the fine screen. The greatly oversized particles tend to clock the fine screen quite rapidly so that the effective straining area thereof is greatly reduced. This requires frequent cleaning of the fine screen and results in frequent interruption of the straining operation.

An object of the invention is to provide new and improved strainers.

A further object of the invention is to provide new and improved strainers for straining plastic material which are relatively uncloggable.

A strainer, illustrative of the invention, includes a pair of backing plates having aligned passages therein. The strainer is positioned at the exit end of an extrusion bore in a conduit through which plastic material is forced. A fine screen is positioned between the two backing plates, and a coarse screen is positioned against the face of the backing plate most adjacent to the extrusion bore. Larger oversized particles of plastic material forced through the strainer from the extrusion bore are strained from the material by the relatively coarse screen, while smaller oversized particles in the plastic material pass through the coarse screen and are strained from the material by the fine screen. Since the total quantity of oversized particles strained from the material is divided between the coarse screen and the fine screen, neither of these screens clogs sufficiently to require frequent cleaning of the screens.

A complete understanding of the invention may be obtained from the following detailed description of a strainer forming a specific embodiment thereof, when read in conjunction with the appended drawing, in which.

Figure 1:
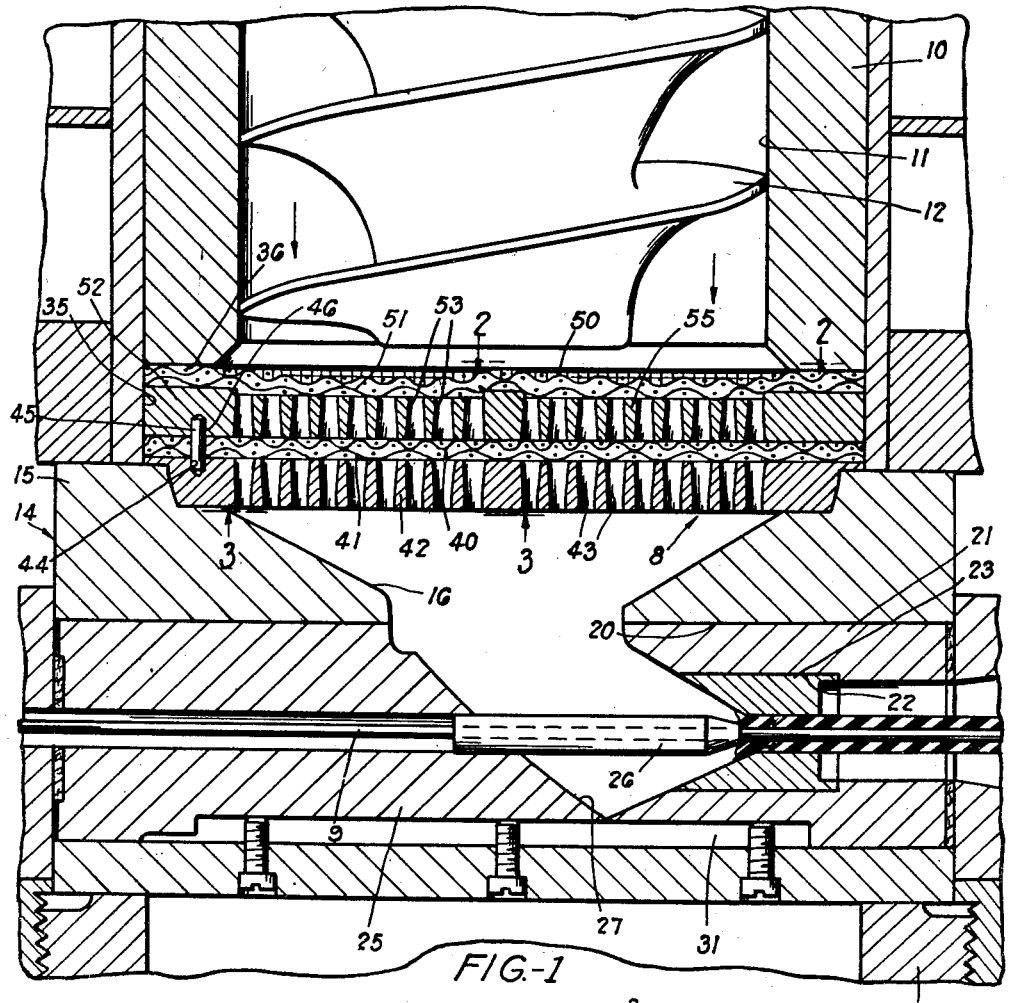
Fig. 1 is a fragmentary, horizontal section of an apparatus including a strainer forming one embodiment of the invention.

Referring now in detail to the drawings, there is shown in Fig. 1 an extruder provided with a strainer 8 forming one embodiment of the invention. The extruder is designed to apply a covering of plastic material, such as a vulcanizable compound including rubber or a synthetic rubber-like material, upon a filamentary conductor 9, which may be bare or covered with a textile or plastic covering. The extruder includes an extrusion cylinder 10 having a cylindrical extrusion bore 11 formed therein in which an elongated stock screw 12 is rotatably mounted. The stock screw is rotated by suitable driving means, such as an electric motor and a gear train (not shown), to force the plastic material through an extruding head 14 under high pressure.

The extruding head 14 includes a body member 15 having a tapered opening 16, which forms a continuation of the extrusion bore 11, and communicates with a bore 20 formed in the extruding head transversely of the tapered opening 16. An annular die holder 21 is positioned in the exit end of the extrusion passage 20 and has a counterbore 22 formed therein in which a forming die 23 is mounted.

The conductor 9 is advanced toward the right, as viewed in Fig. 1, by suitable core-advancing means, such as a capstan (not shown), through a core-tube holder 25 and a core tube 26, which is held by the core tube holder. The core tube holder is provided with an inclined concave surface 27 for directing the plastic material toward the die 23, and an aligning plate 31 maintains the die holder 21 and the core tube holder 25, and thereby the die 23 and the core tube 26, centered relative to each other in the bore 20 in the extruding head 14, and the retaining nut 32 holds these elements in place in the extruding head.

The extrusion cylinder 10 of the extruder is provided with a counterbore 35 and has an annular shoulder 36 at the exit end of the extrusion bore 11. A fine straining screen 40, which should have a mesh of a size between 50 and 180, abuts a heavy backing screen 41, which should have a mesh of a size between 16 and 10. The backing plate 42, which has a plurality of passages 43—43 therein supports the backing screen 41. The cross-sectional area of each of the passages 43—43 is largest at the portions thereof adjacent to the backing screen 41 to increase the effective screening area of the screen 40 and to create some back pressure of the material to support the screen 40, and each of the passages 43—43 tapers to a smaller cross-sectional area at the portions thereof near the central portion of the backing plate so that enough metal is left in the backing plate 42 that the strength of the backing plate 42 is sufficient to withstand the high extrusion pressures of the plastic material forced therethrough. The backing plate 42 is provided with a bore 44, and a dowel 45 fits into the bore 44 and a bore 46 formed in a backing plate 52 to orient backing plates 42 and 52 when they are positioned in the counterbore 35 formed in the extrusion cylinder 10 of the extruder.

Figures 2, 3:
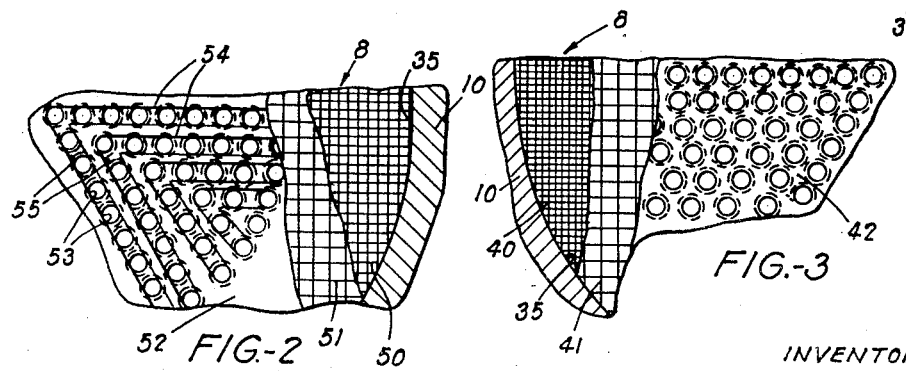
Fig. 2 is a fragmentary, vertical section taken along line 2—2 of Fig. 1 with portions thereof broken away.
Fig. 3 is a fragmentary, vertical section taken along line 3—3 of Fig. 1 with portions thereof broken away.

A coarse screen 51, which is identical with the coarse screen 41, is supported by the backing plate 52 and supports a medium straining screen 50, which should have a mesh of about size 30. The backing plate 52 is provided with a plurality of passages 53—53 formed therein, which are arranged in rows 54—54 (Fig. 2), and grooves 55—55 extending along the rows 54—54 are formed in the backing plate 52. The grooves 55—55 increase the effective screening area of the screen 50 but do not greatly weaken the backing plate 52. The passages 53—53 in the backing plate 52 are aligned with the passages 43—43 formed in the backing plate 42 by the action of the dowel 45 in the bores 44 and 46 and the counterbore 35 in the extrusion cylinder 10 of the extruder. The passages 53—53 taper outwardly from the central portions thereof to the exit portions thereof at which exit portions the fine straining screen 40 is positioned so that the effective screen area of the fine straining screen 40 is large and the pressure on material being forced through the passages 53—53 is relieved as the material approaches the screen 40, while the backing plate 52 retains ample strength to withstand the high extrusion pressures.

In the operation of the apparatus described hereinabove the plastic material is forced through the extrusion bore 11 in the extrusion cylinder 10 by the stock screw 12 in the direction of the arrows in Fig. 1. The material is forced through the medium straining screen 50, the coarse backing screen 51, the grooves 55—55 and the passages 53—53 in the backing plate 52. The medium straining screen 50 strains out any large oversized particles, and prevents passage thereof to and through the coarse backing screen 51 and the passages 53—53, whereby the screen 50 prevents accumulation of the large oversized particles on the fine straining screen 40.

The plastic material having the large oversized particles strained therefrom then flows through the fine straining screen 40, the coarse backing screen 41 and the passages 43—43 in the backing plate 42 into the extrusion passage 16 in the body member 15 of the extrusion head 14. The fine straining screen 40 strains out all oversized particles not caught by the medium screen 50 so that no oversized particles are in the portion of the material forced completely through the strainer. This portion of the plastic material flows through the tapered passage 16, and the die 23 forms the plastic material into a covering upon the conductor 9 as the conductor is advanced through the extruding head.

The medium straining screen 50 strains out all the large oversized particles from the plastic material being extruded, and the fine straining screen 40 strains out the residue of the oversized particles from the plastic material. Hence, the total quantity of oversized particles caught on either the screen 50 or the screen 40 is not as large as the total quantity of oversized particles strained from the material so that neither the screen 40 nor the screen 50 are badly clogged, even though a quantity of oversized particles sufficient to clog the screen 40 is strained by the two straining screens. Hence, the strainer 8 is effective for long operating runs without cleaning or replacement.

What is claimed is:

1. A strainer, which comprises a conduit, means for forcing plastic material through the conduit, a coarse straining screen, a backing plate supporting the coarse straining screen, a fine straining screen positioned against the backing plate on the discharge side thereof, a second backing plate supporting the fine straining screen against the first-mentioned backing plate, said first-mentioned backing plate being provided with a plurality of passages having outlet portions larger than the inlet portions thereof, said second backing plate being provided with a plurality of passages having inlet portions which are larger than the outlet portions thereof, and means for locating the backing plates in positions in which the passages therein are aligned, whereby the effective straining area of the fine straining screen is high.

2. A strainer, which comprises an extrusion cylinder having an extrusion bore therein, said extrusion cylinder being provided with a counterbore at the exit end of the extrusion bore, an extrusion head having a passage aligned with the extrusion bore in the extrusion cylinder and also being provided with a counterbore, said counterbores serving to form an annular groove, means for forcing plastic material through the extrusion bore to the extrusion head, a coarse straining screen positioned in the groove, a backing plate positioned in the groove and supporting the coarse straining screen, a fine straining screen positioned against the backing plate in the groove on the discharge side thereof, and a second backing plate positioned in the groove supporting the fine straining screen, said first-mentioned backing plate being provided with a plurality of passages having outlet portions which are larger than the inlet portions thereof and said second backing plate being provided with a plurality of passages having inlet portions which are larger than the outlet portions thereof, whereby the effective straining area of the fine screen is high.

3. An extruder, which comprises an extrusion cylinder having an extrusion bore therein, said cylinder being provided with a counterbore at the exit end of the extrusion bore, an extrusion head having a passage aligned with the extrusion bore in the extrusion cylinder and also being provided with a counterbore, said counterbores serving to form an annular groove, means for forcing plastic material through the extrusion bore to the extrusion head, a coarse straining screen positioned in the groove, a backing plate positioned in the groove and supporting the coarse straining screen, a fine straining screen positioned behind the backing plate and against the backing plate on the discharge side thereof, and a second backing plate positioned in the groove and supporting the fine straining screen, said first-mentioned backing plate being provided with a plurality of passages having inlet portions smaller than the outlet portions thereof to relieve the pressure on the material and said second backing plate being provided with a plurality of passages aligned with the outlet portions of the passages in the first-mentioned backing plate, whereby the straining area of the fine straining screen is high.

GEORGE E. GLISS.

REFERENCES CITED

The following references are of record in the file of this patent:

UNITED STATES PATENTS

| Number | Name | Date |
|---|---|---|
| 642,813 | Cowen | Feb. 6, 1900 |
| 1,446,187 | Kessler | Feb. 20, 1923 |
| 1,732,618 | Royle | Oct. 22, 1929 |
| 1,931,872 | Lodge | Oct. 24, 1933 |
| 2,261,977 | Deutsch | Nov. 11, 1941 |